Oct. 10, 1950     L. L. SIMKINS     2,524,841
POLARITY INDICATOR FOR VOLTAGE TESTERS
Filed April 19, 1949
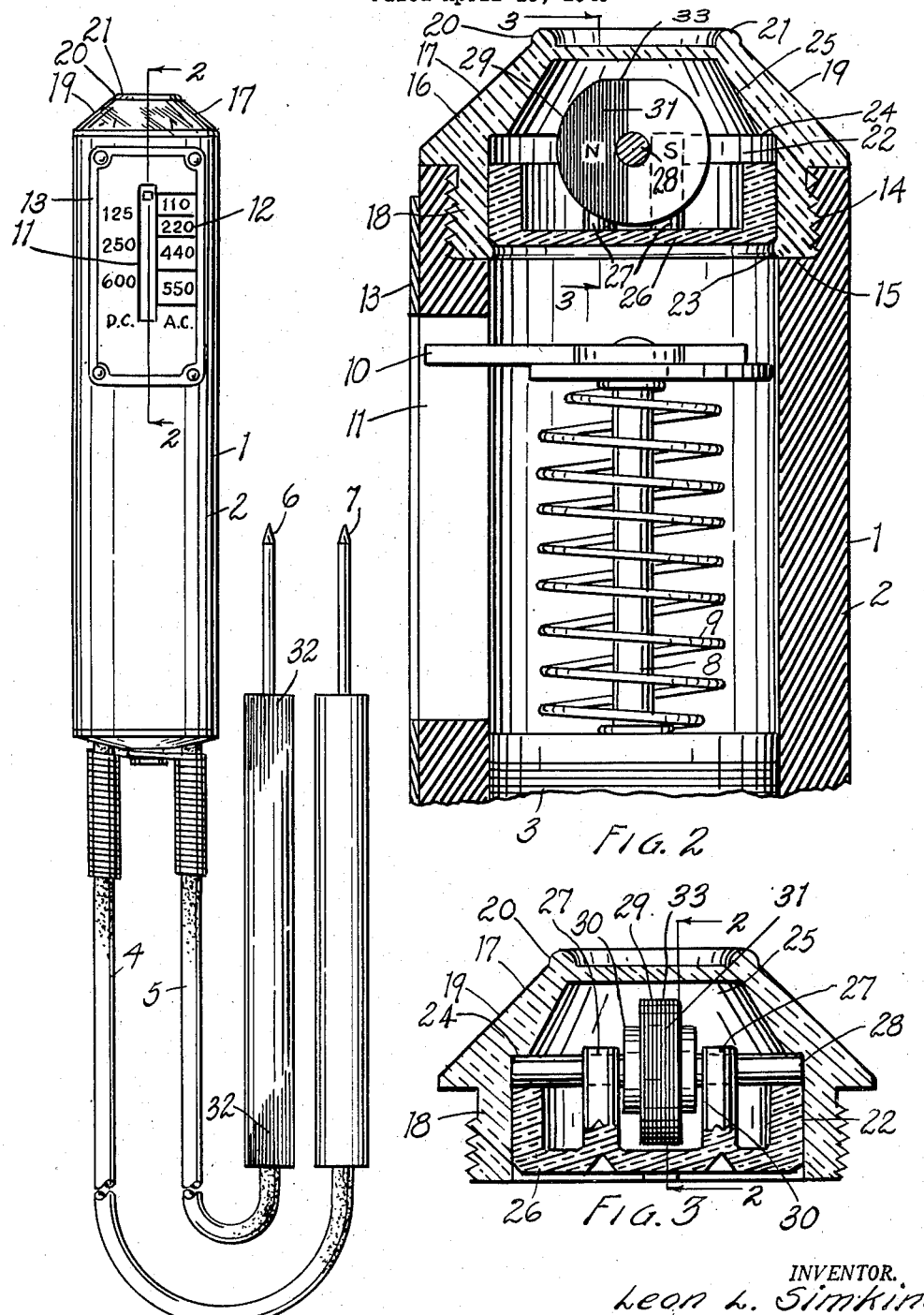
INVENTOR.
Leon L. Simkins Patented Oct. 10, 1950

2,524,841

UNITED STATES PATENT OFFICE 2,524,841

POLARITY INDICATOR FOR VOLTAGE TESTERS

Leon L. Simkins, Kalamazoo, Mich.

Application April 19, 1949, Serial No. 88,267

14 Claims. (Cl. 171—95)

1

This invention relates to improvements in polarity indicator for voltage testers.

My polarity indicator is particularly designed for use with voltage testers of the type disclosed in Patent No. 2,075,860, issued April 6, 1937, to Hugh F. Mehaffie, but is also useful with other voltage testers and electrical testing equipment.

The principal objects of this invention are:

First, to provide a polarity indicator which is easily mounted on the end of a voltage tester having a movable armature so that the instrument will simultaneously indicate the voltage and polarity of a circuit being tested.

Second, to provide a polarity indicator which is positive in operation and not easily damaged or thrown out of operating condition.

Third, to provide a combined voltage testing polarity indicating instrument in which the field for actuating the polarity indicator is automatically maintained at a relatively constant value by the operation of the indicating mechanism of the voltage tester as the voltage applied to the instrument is varied.

Fourth, to provide a polarity indicator in combination with the field coil of a voltage tester in which the polarity indicator is protected against abnormally strong alternating magnetic fields by being positioned remotely from the coil of the voltage indicator.

Other objects and advantages relating to details of my polarity indicator will be apparent from a consideration of the following description and claims. The drawings, of which there is one sheet, illustrate a preferred form of my polarity indicator as assembled on a voltage testing instrument.

Fig. 1 is an elevational view of the complete instrument.

Fig. 2 is a fragmentary cross sectional view through the polarity indicator and a portion of the voltage tester taken along the plane of the lines 2—2 in Figs. 1 and 3.

Fig. 3 is a cross sectional view through the polarity indicator taken along the plane of the line 3—3 in Fig. 2.

In the drawings I have illustrated a voltage tester generally indicated at 1 and consisting of a tubular case 2 enclosing a coil 3. Test leads 4 and 5 are connected to the ends of the coil and extend from the case to test prods 6 and 7 for connecting the tester to a circuit to be tested. A longitudinally slidable metal core or armature 8 is positioned within the tube and coil to be drawn into the coil upon excitation thereof. A coil spring 9 biases the armature outwardly of the

2 coil and an indicator 10 carried on the end of the rod projects through a slot 11 in the wall of the tube for cooperation with indicia scales 12 printed on a plate 13. The instrument thus far described is essentially the same as that disclosed in the above mentioned patent to Mehaffie.

The upper end of the tubular body 2 is internally threaded as at 14 and shouldered at 15, the thread and shoulder in Mehaffie's instrument serving to receive a closure plug. My polarity indicator generally indicated at 16 is arranged to take the place of the plug in the Mehaffie instrument without further alteration of the instrument. The polarity indicator consists of a transparent plastic cap 17 having a threaded neck 18 engageable with the threads 14 and the shoulder 15. The upper end of the cap 17 is provided with tapered walls 19 terminating at the circular top wall 20. A protective rim or bead 21 is formed around the top wall 20 to prevent scratching or damaging the top wall which is used as a viewing window as will be described presently.

Interiorly the cap 17 forms a cylindrical recess 22 opening to the bottom of the cap and having one or more ears or lugs 23 projecting radially inwardly from the lower edge thereof. The upper end of the recess 22 terminates in a shoulder 24 above which is formed a truncated conical recess 25 extending to the top wall 20.

Positioned within the cylindrical recess 22 is a cup-like member 26 of plastic or other non-magnetic material, the cup being pressed into the cylindrical recess and retained in place by the lugs 23 which snap over the lower edge of the cup. Projecting upwardly from the bottom of the cup 26 are two transversely spaced pairs of posts 27 which project upwardly above the top of the rim of the cup member. The posts 27 of each pair are longitudinally spaced as is best illustrated in Fig. 2 to tightly receive a brass or other nonmagnetic axle 28 therebetween. The ends of the axle are supported on the rim of the cup 26 and retained against the shoulder 24 when the indicator is assembled.

Mounted on the axle 28 and between the pairs of posts 27 is a permanently magnetized disc 29. The disc 29 is freely rotatable on the axle 28 and a pair of washers 30 are provided, one on each side of the disc to prevent it from becoming jammed against the posts 27. The polarity of the disc is indicated by some suitable means, such as the red paint indicated at 31, to be readily distinguishable through the top wall 20 of the indicator. Preferably the polarity marking on the magnet is made to correspond with a polarity indicia such as the red color of the handle on prod 6 as indicated at 32.

When the voltage tester is applied to a circuit to be tested the magnetic field of the coil 3 actuates the armature 8 and indicator 10 to give a reading of the voltage of the circuit. A portion of the magnetic field of the coil is extended through the armature to actuate the magnet 29 so that either the north or south pole of the magnet will be attracted to the end of the armature 8 and the coil. By proper connection of the red prod 6 to the coil 3 the magnet 29 will be swung so that the red and north pole of the magnet is up when the red prod is connected to the positive side of the circuit being tested as will be readily understood.

Since the voltage tester draws the armature away from the polarity indicator to a greater extent as the voltage increases the magnetic field around the magnet remains substantially constant. The spacing of the magnet from the full and natural field of the coil 3 prevents the magnet from being effected adversely by the alternating field of the coil should the tester be used on an alternating coil circuit. The close fit between the cup member 26 and the cap 17 seals the magnet of the polarity indicator from dust and moisture and the polarity indicator is of simple sturdy construction and capable of withstanding normal hard useage and handling without getting out of order. The magnet will always respond to the effect of the magnetic field of the coil whatever the polarity of the field and it should be noted that the magnet is slightly unbalanced by grinding away one of its edges slightly between the pole faces as at 33 in Fig. 2. This prevents the magnet from coming to rest in a dead center position where the force of the magnetic field on the poles would be directed through the axle and thus fail to produce any rotation of the magnet.

Having thus described my invention, what I claim as new and desire to secure by Letters Patent is:

1. A polarity indicator for attachment to a voltage tester having a tubular body with an armature member slidable therein, comprising, a transparent cap member having a thread portion adapted to engage the end of said body and forming a cylindrical recess opening into said body, a shoulder within said cap member at the end of said cylindrical recess, a transparent top wall on said cap member, a cup-like base member tightly fitted within said recess, four rectangularly spaced posts projecting from the bottom of said cup member to above the level of said cup member, a nonmagnetic axle laterally restrained between said posts and supported at its ends on the rim of said cup member and against said shoulder perpendicular to the axis of said armature member, and a permanently magnetized disc freely rotatable on said axle and laterally restrained thereon by said posts, the polarity of said disc being determined along a diameter thereof, said disc having polarity indicia thereon visible through said top wall.

2. A polarity indicator for attachment to a voltage tester having a tubular body with an armature member slidable therein, comprising, a transparent cap member having a thread portion adapted to engage the end of said body and forming a cylindrical recess opening into said body, a shoulder within said cap member at the end of said cylindrical recess, a cup-like base member tightly fitted within said recess, four rectangularly spaced posts projecting from the bottom of said cup member to above the level of said cup member, a nonmagnetic axle laterally restrained between said posts and supported at its ends of the rim of said cup member and against said shoulder perpendicular to the axis of said armature member, and a permanently magnetized disc freely rotatable on said axle and laterally restrained thereon by said posts, the polarity of said disc being determined along a diameter thereof, said disc having polarity indicia thereon visible through said cap member.

3. A polarity indicator for attachment to a voltage tester having a tubular body with an armature member slidable therein, comprising, a cap member having a thread portion adapted to engage the end of said body and forming a cylindrical recess opening into said body, a transparent wall forming part of said cap member, a base member tightly fitted within said recess, spaced projections from the bottom of said base member extending inwardly of said cap member, a non-magnetic axle laterally restrained between part of said projections and supported at its ends on others of said projections and against the inside of said cap, and a permanently magnetized disc freely rotatable on said axle and laterally restrained thereon by part of said projections, the polarity of said disc being determined along a diameter thereof.

4. A polarity indicator for attachment to a voltage tester having a tubular body with an armature member slidable therein, comprising, a cap member having a thread portion adapted to engage the end of said body and forming a cylindrical recess opening into said body, a transparent wall forming part of said cap member, a base member tightly fitted within said recess, spaced projections from the bottom of said base member extending inwardly of said cap member, a nonmagnetic axle laterally restrained between part of said projections and supported at its ends on others of said projections and against the inside of said cap, and a permanently magnetized disc freely rotatable on said axle, the polarity of said disc being determined along a diameter thereof.

5. A polarity indicator for attachment to a voltage tester having a hollow body with an armature and coil therein, comprising, a cap member adapted to engage the end of said body and forming a cylindrical recess opening toward said body, a base member carried by said cap member, spaced projections on one of said members and extending toward the other of said members, a nonmagnetic axle laterally restrained between said projections and supported at its ends between said members perpendicular to the longitudinal axis of said coil, and a permanently magnetized disc freely rotatable on said axle and laterally restrained thereon by said projections, the polarity of said disc being determined along a diameter thereof, one of said members having a transparent portion through which said disc is visible.

6. A polarity indicator for attachment to a voltage tester having a hollow body with an armature and coil therein, comprising, a cap member adapted to engage the end of said body and forming a recess, a base member carried by said cap member, spaced projections on one of said members and extending toward the other of said members, a nonmagnetic axle laterally restrained between said projections and supported at its ends between said members perpendicular to the longitudinal axis of said coil, and a permanently magnetized disc freely rotatable on said axle, the polarity of said disc being determined along a diameter thereof, one of said members having a transparent portion through which said disc is visible.

7. A combined voltage testing and polarity indicating instrument comprising, a body member, a coil positioned within said body and having test leads extending exteriorly of said body, an armature slidable axially of said coil and having an indicator adapted to indicate the voltage applied to said coil, an axle spaced from the end of said armature opposite from said coil and extending perpendicularly to the axis of said armature, and a metal disc freely rotatable on said shaft, said disc being magnetized along a diameter thereof to be rotatably deflected by changes in the magnetic field of said coil extended by said armature.

8. A combined voltage testing and polarity indicating instrument comprising, a body member, a coil positioned within said body and having test leads extending exteriorly of said body, an armature slidable axially of said coil and having an indicator adapted to indicate the voltage applied to said coil, a housing having a transparent wall, said housing being secured to said body at one end thereof, an axle in said housing and spaced from the end of said armature opposite from said coil and extending perpendicularly to the axis of said armature, and a metal disc freely rotatable on said shaft, said disc being magnetized along a diameter thereof to be rotatably deflected by changes in the magnetic field of said coil extended by said armature.

9. A combined voltage testing and polarity indicating instrument comprising, a body member, a coil positioned within said body and having test leads extending exteriorly of said body, an armature slidable axially of said coil and having an indicator adapted to indicate the voltage applied to said coil, a housing having a transparent wall, said housing being secured to said body, an axle in said housing and spaced from the end of said armature opposite from said coil and extending perpendicularly to the axis of said armature, and a metal disc freely rotatable on said shaft, said disc being magnetized along a diameter thereof to be rotatably deflected by changes in the magnetic field of said coil.

10. A polarity indicator for attachment to a voltage tester having a hollow body with an armature and coil therein, comprising, a cap member adapted to engage the end of said body and forming a recess, a base member carried by said cap member, spaced projections on one of said members and extending toward the other of said members, a nonmagnetic axle laterally restrained between said projections and supported at its ends between said members perpendicular to the longitudinal axis of said coil, and a permanently magnetized disc freely rotatable on said axle, the polarity of said disc being determined along a diameter thereof, one of said members having a transparent portion through which said disc is visible, said disc being cut away 90° from the poles thereof to slightly unbalance said disc.

11. A polarity indicator for attachment to a voltage tester having a hollow body with an armature and coil therein, comprising, a cap member adapted to engage the end of said body and forming a recess, a base member carried by said cap member, spaced projections on one of said members and extending toward the other of said members, a nonmagnetic axle laterally restrained between said projections and supported at its ends between said members perpendicular to the longitudinal axis of said coil, and a permanently magnetized disc freely rotatable on said axle, the polarity of said disc being determined along the periphery thereof, one of said members having a transparent portion through which said disc is visible, said disc being slightly unbalanced between the poles thereof.

12. A polarity indicator for attachment to a voltage tester having a hollow body with an armature and coil therein, comprising, a cap member adapted to engage the end of said body and forming a recess, a base member carried by said cap member, spaced projections on one of said members and extending toward the other of said members, a nonmagnetic axle laterally restrained between said projections and supported at its ends between said members perpendicular to the longitudinal axis of said coil, and a permanently magnetized disc freely rotatable on said axle, the polarity of said disc being determined along the periphery thereof.

13. A combined voltage testing and polarity indicating instrument comprising, a body member, a coil positioned within said body and having test leads extending exteriorly of said body, an armature slidable axially of said coil and having an indicator adapted to indicate the voltage applied to said coil, a housing having a transparent wall, said housing being secured to said body, an axle in said housing and spaced from the end of said armature opposite from said coil and extending perpendicularly to the axis of said armature, and a metal disc freely rotatable on said shaft, said disc being magnetized to provide poles along the periphery thereof to be rotatably deflected by changes in the magnetic field of said coil, said disc being unbalanced between said poles.

14. A combined voltage testing and polarity indicating instrument comprising, a body member, a coil positioned within said body and having test leads extending exteriorly of said body, an armature slidable axially of said coil and having an indicator adapted to indictae the voltage applied to said coil, a housing having a transparent wall, said housing being secured to said body, an axle in said housing and spaced from the end of said armature opposite from said coil and extending perpendicularly to the axis of said armature, and a metal disc freely rotatable on said shaft, said disc being magnetized to provide poles along the periphery thereof to be rotatably deflected by changes in the magnetic field of said coil.

LEON L. SIMKINS.

No references cited.